United States Patent [19]

Haga

[11] 4,029,950
[45] June 14, 1977

[54] NUMERICAL CONTROL SYSTEM FOR MACHINES UTILIZING A PROGRAMMABLE SEQUENCE CONTROLLER

[75] Inventor: Kyosuke Haga, Anjo, Japan

[73] Assignee: Toyoda-Koki Kabushiki Kaisha, Japan

[22] Filed: Apr. 22, 1976

[21] Appl. No.: 679,450

[30] Foreign Application Priority Data

May 9, 1975 Japan.................................50-55791

[52] U.S. Cl. .......................... 235/151.11; 318/569; 444/1
[51] Int. Cl.² ...................................... G05B 19/28
[58] Field of Search .................. 235/151.11, 151.1; 445/1

[56] References Cited

UNITED STATES PATENTS

| | | |
|---|---|---|
| 3,668,653 | 6/1972 | Fair et al. .............................. 445/1 |
| 3,760,169 | 9/1973 | Paculat ...................... 235/151.11 X |
| 3,763,360 | 10/1973 | Nishimura et al. ............ 235/151.11 |

Primary Examiner—Eugene G. Botz
Attorney, Agent, or Firm—Oblon, Fisher, Spivak, McClelland & Maier

[57] ABSTRACT

A numerical control system utilizes a programmable sequence controller as a data transmitter for transmitting numerical control data from a digital computer to machine controllers associated with numerically controlled machine tools. The digital computer converts each of the least units of the numerical control data to a predetermined number of output commands and, upon request, transfers the output commands along with address codes to the sequence controller which has an input-output circuit connected at its output terminals with data input terminals of the machine controllers, so that by selectively setting and resetting the output terminals designated by the address codes, the sequency controller can supply the numerical control data to any one of the machine controllers.

20 Claims, 16 Drawing Figures

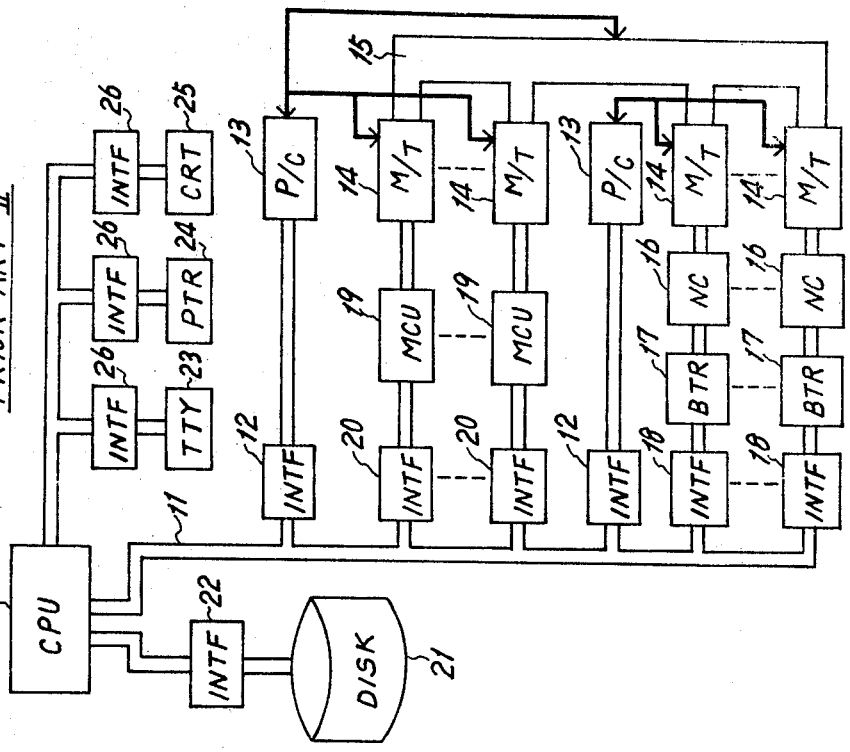
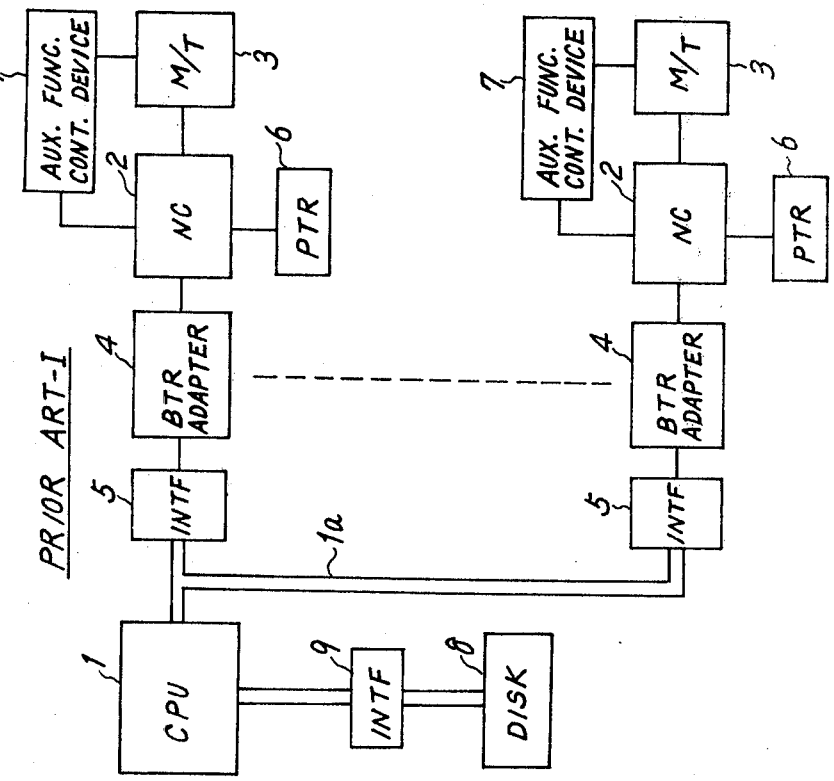

| | b8 b7 b6 b5 b4 b3 b2 b1 |
|---|---|
| N | 0 1 0 0 0 1 0 1 |
| 0 | 0 0 1 0 0 0 0 0 |
| 0 | 0 0 1 0 0 0 0 0 |
| 1 | 0 0 0 0 0 0 0 1 |
| X | 0 0 1 1 0 1 1 1 |
| — | 0 1 0 0 0 0 0 0 |
| 1 | 0 0 0 0 0 0 0 1 |
| 2 | 0 0 0 0 0 0 1 0 |
| 5 | 0 0 0 1 0 1 0 1 |
| 0 | 0 0 1 0 0 0 0 0 |
| F | 0 1 1 1 0 1 1 0 |
| 0 | 0 0 1 0 0 0 0 0 |
| CR | 1 0 0 0 0 0 0 0 |

N 0 0 1 X - 1 2 5 0 F 0

| Step | Command | Address |
|---|---|---|
| 1 | SOF (0) | 108 (SP) |
| 2 | SON (1) | 100 (b1) |
| 3 | SOF (0) | 101 (b2) |
| 4 | SON (1) | 102 (b3) |
| 5 | SOF (0) | 103 (b4) |
| 6 | SOF (0) | 104 (b5) |
| 7 | SOF (0) | 105 (b6) |
| 8 | SON (1) | 106 (b7) |
| 9 | SOF (0) | 107 (b8) |
| 10 | SON (1) | 108 (SP) |

DECODING PROGRAM FOR M03

| | Command | Address | Meaning |
|---|---|---|---|
| 1 | TNA | 200 | Is mf in set condition? |
| 2 | TNA | 201 | " m1 " " |
| 3 | TNA | 202 | " m2 " " |
| 4 | TFA | 203 | Is m3 in reset condition? |
| 5 | TFA | 204 | " m4 " " |
| 6 | TFA | 205 | " m5 " " |
| 7 | TFA | 206 | " m6 " " |
| 8 | TFA | 207 | " m7 " " |
| 9 | TFA | 208 | " m8 " " |
| 10 | YON | 113 | Set terminal for M03 if examination results of mf~m8 are satisfied. |

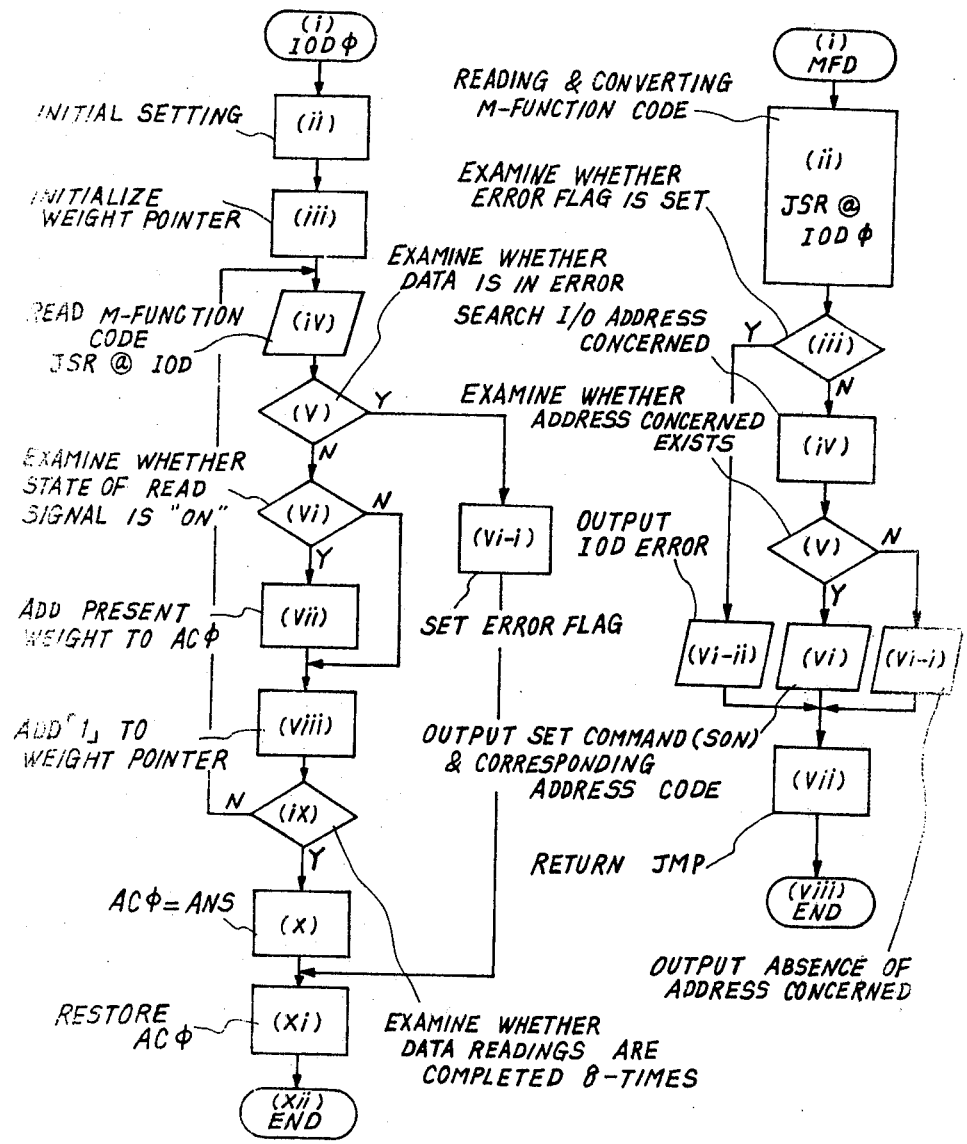

NUMERICAL CONTROL SYSTEM FOR MACHINES UTILIZING A PROGRAMMABLE SEQUENCE CONTROLLER

BACKGROUND OF THE INVENTION

1. Field of the Invention

This invention relates generally to a numerical control system for machines and, more particularly, to a numerical control system with a programmable sequence controller for effecting the transmission of various control data between a digital computer and a plurality of numerically controlled machines governed by the computer.

2. Description of the Prior Art

In general, in a direct control system using a computer to control numerically controlled machine tools, there has been extensively adopted a system with so-called BTR-adapters 4, 4, as shown in FIG. 1. In this system, numerical control data are supplied through the BTR-adapters 4, 4, each serving as a data link device, not from tape readers 6, 6 of numerical controllers 2, 2, but from a central computer 1. The numerical control data supplied through the BTR-adapter 4 is decoded in the numerical controller 2, roughly to a feed control data and an auxiliary function data, the former of which is processed under interpolation arithmetic to be distributed to servomotors, the auxiliary function data being then transmitted to an auxiliary function control device 7 to instruct a functional operation corresponding thereto. The functional control device 7 is ordinarily constructed by relay circuits and performs a sequence control by activating a relevant relay in accordance with the auxiliary function data.

The BTR-adapters 4, 4 are connected by means of interface units 5, 5 with a data line 1a, which includes a plurality of data transfer lines for transferring data and a plurality of control signal lines for requesting and setting the data. The BTR-adapters 4, 4 are paired respectively with the numerical controllers 2, 2 for exclusive use, and each has a distinctive hard-wired construction. However, components of the BTR-adapter 4 often malfunction so that the operational reliability of the adapter 4 is lowered in proportion to the number of components. Further drawbacks are present because the design of the adapter 4 is quite time consuming and an increase in the number of components undesirably elevates the cost.

There is also known a programmable sequence controller which is used only to control the sequence operations of machines in lieu of relay circuits. For this reason, even where the sequence controller is employed in a computer controlled system for numerically controlled machine tools, the sequence controller only serves to control the sequence operations of the machine tool and the conveyer apparatus for conveying workpieces between the machine tools. Since it is possible to monitor the operational conditions of the machines, the sequence controller can perform a trouble diagnosis for the machines under the control of a computer 10 by being connected with the computer through an interface circuit 12, as illustrated in FIG. 2.

In FIG. 2, there is provided a magnetic disk 21 as an outer memory device which is connected with the computer 10 through an interface circuit 22. A teletypewriter 23, a paper-tape reader 24, and a display device 25 of a cathode ray tube type are also connected with the computer 10 respectively through interface circuits 26. Data lines to numerical controllers 16, 16 are provided separate from the data line to the sequence controller 13. Accordingly, such a BTR-adapter 17 as the foregoing and an appropriate data line have to be furnished for each unit of an individual machine tool 14, thus resulting in complicating the entire construction of the control system, raising the production cost, and prolonging the necessary term for design and production.

FIG. 2, each of the machine control units 19, 19 is provided to control servomotors of the associated machine tool 14 upon receipt of interpolation data which is calculated by the computer 10 in accordance with well-known arithmetic methods, and is different from the numercial controller 16 in that it does not have an arithmetic function for the interpolation data. In this connection, the data which is fed from the computer 10 through an interface circuit 20 is different in its format from the data fed to the numerical controller 16. However, the present invention is applicable also to the system using the machine control units 19, 19 as well as that using the numerical controllers 16, 16.

SUMMARY OF THE INVENTION

It is therefore a primary object of the present invention to provide a new and improved numerical control system for machines which substitutes a programmable sequence controller for such BTR-adapters for transmitting numerical control data from a computer to machine controllers for a plurality of numerically controlled machines.

Another object of the present invention is to provide an improved numerical control system in which data transmission between a digital computer and machine controllers as well as sequence controls of machine tools is performed by a programmable sequence controller.

Still another object of the present invention is to provide an improved numerical control system in which a programmable sequence controller transmits each of the least units of numerical control data in the form of a predetermined number of set and reset output commands.

Yet another object of the present invention is the provision of an improved numerical control system in which a programmable sequence controller transmits interpolation data calculated by a digital computer to a machine control unit for enabling a machine tool to perform a contouring control operation.

A further object of the present invention is the provision of an improved numerical control system in which a digital computer and a programmable sequence controller are cooperable with each other so as to monitor data request signals generated from machine controllers.

Briefly, the foregoing and other objects are attained by the present invention through the provision of a numerical control system which comprises a plurality of numerically controlled machines, machine controllers for controlling the respective machines in accordance with numerical control data, a digital computer provided with a memory device for storing the numerical control data and adapted to convert each of the least units of the numerical control data to a predetermined number of set and reset commands, and a programmable sequence controller. This sequence controller includes an input-output circuit having output terminals addressed to data input terminals of the machine controllers, a program memory device containing a predetermined sequence control program, and a logic control circuit for setting one of the output terminals as a result of examining the signal conditions of the inputs terminals in accordance with the sequence control program, and in order to serve as a data transmitter, is further provided with a register circuit for receiving from the digital computer the set and reset commands along with address codes designating the output terminals assigned to the data input terminals. Accordingly, the logic control circuit is able to selectively set and reset the output terminals designated by the address codes when the set and reset commands and the address codes are supplied to the register circuit so that the numerical control data may be transferred through the sequence controller to the machine controllers.

BRIEF DESCRIPTION OF THE DRAWINGS

Various objects, features and attendant advantages of the present invention will be more fully appreciated as the same becomes better understood from the following detailed description of the present invention when considered in connection with the accompanying drawings, in which:

FIG. 1 is a schematic block diagram of a prior art numerical control system using a computer for the machine tools;

FIG. 2 is a schematic block diagram of another prior art system;

FIGS. 14 and 15 show an auxiliary function decoding program provided for the digital computer.

DETAILED DESCRIPTION OF A PREFERRED EMBODIMENT

Figure 3:
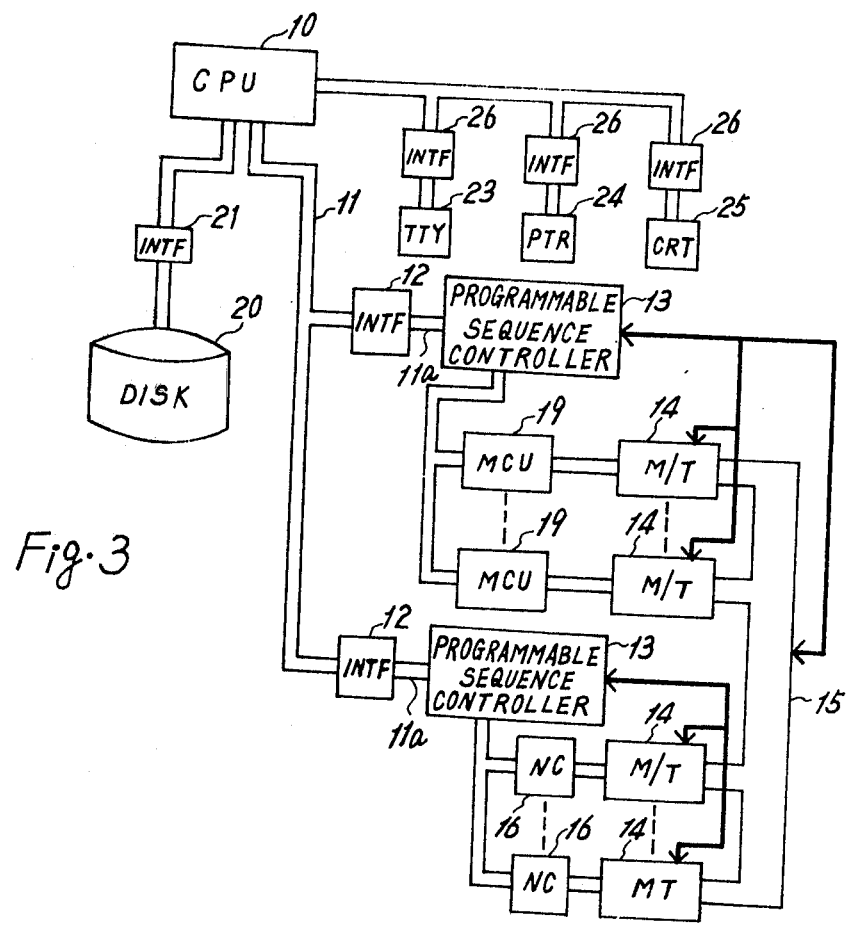
FIG. 3 is a schematic block diagram of a numerical control system according to the present invention.

Referring now to the drawings, wherein like reference numerals designate the same or corresponding parts throughout the several views, and particularly to FIG. 3, there is illustrated a computer-controlled system for numerically controlled machine tools 14, 14 which is modified from the prior art system shown in FIG. 2 in accordance with the present invention. It is noted that the system components which are the same as those in the prior art system are represented by the same reference numerals for convenience in explanation.

Connected with a computer, specifically a so-called mini-computer 10 of the digital type, through interface circuits 12, 12 are programmable sequence controllers 13, 13 to which numerical controllers 16, 16 and machine control units 19, 19 are connected respectively. No modification is made regarding the connection of the sequence controller 13 with the machine tools 14, 14 and with the conveyer apparatus 15.

Figure 4:
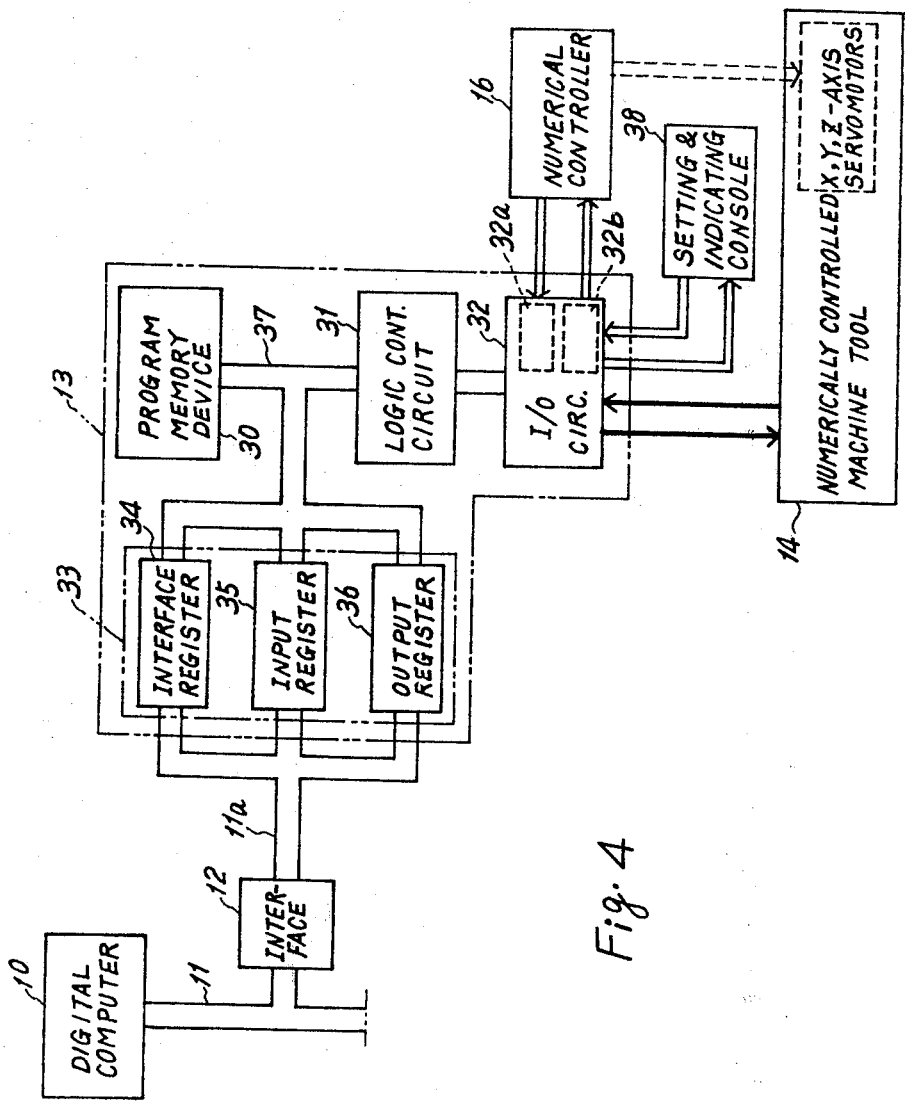
FIG. 4 is a simplified block diagram of the programmable sequence controller in FIG. 3, especially showing the connection to a digital computer and a numerical controller.

Each of the numerical controllers 16, 16 is, as shown in FIG. 4, connected to an input-output circuit 32 of the sequence controller 13, and to be more exact, input terminals of the numerical controller 16, for receiving the numerical control data and an output terminal for requesting the control data are connected respectively to specified addresses of an output circuit 32b and a specified address of an input circuit 32a. This connection to the input-output circuit 32 of the sequence controller 13 is in the same manner as the connection of the machine tool 14 thereto except that the addresses are different for each of the terminals. A few suitable convertors for the matching of signal levels may be required.

There is further connected to the input-output circuit 32 a setting and indicating console 38 which is associated with one of the machine tools 14, 14, and in which a workpiece-number setting switch, a number indicating tube, indicating lamps, and push-button switches are disposed. When a desired workpiece number is set on the setting switch, a numerical control data distinguished by the number is supplied from the computer 10 to the numerical controller 16 through the sequence controller 13 and, at the same time, an indication of the number is displayed on the number indicating tube.

Although the connection between the sequence controller 13 and the computer 10 is completed through the interface 12, an interface register 34, an input register 35, and an output register 36 are provided as an interior interface 33 of the sequence controller 13. These registers 34, 35, and 36 are interconnected between the computer's output data line 11a and a memory bus line 37 which connects a program memory device 30 with a logic control circuit 31, in the sequence controller 13. The input register 35 and the output register 36 are utilized chiefly for performing the monitoring operation, while the interface register 34 and the output register 36 are utilized chiefly for effecting the distribution of the numerical control data. In the sequence controller 13, a predetermined sequence control program is memorized within the memory device 30 and is read out word by word in order of the program. The logic control circuit 31 interprets any instruction word when read and sets the result of the interpretation in the input-output circuit 32.

Execution modes of the instruction words are roughly classified in two categories, one of which is the execution of an examine command according to which any one of the terminals of the input-output circuit 32 designated by the associated address information is examined with its signal condition (ON-OFF condition). The other execution mode is the execution of an output command, according to which any one of the terminals of the output circuit 32b designated by the associated address information is energized or deenergized. Each of the commands comprises 16-signal bits and has at its 0-4th bit positions one of the examine command codes (TNA, TFA, TNO and TFO) or one of output command codes (SON and SOF) and has at its 5-15th bit positions an address code of a binary decimal which designates one of the terminals of the input-output circuit 32 to be examined, energized or deenergized.

The following table shows the examine and output-command codes.

| TYPE | SYMBOL | MEANING |
| --- | --- | --- |
| Examine Command | TNA | examine whether input is ON under the condition of being ANDed with another input. |
| | TFA | examine whether input is OFF under the condition of being ANDed with another input. |
| | TNO | examine whether input is ON under the the condition of being ORed with another input. |
| | TFO | examine whether input is OFF under the condition of being ORed with another input. |
| Output Command | SON | set output |
| | SOF | reset output |

In the execution of the examine command, the ON (or OFF) condition of a limit switch or the like which is connected with an address designated by an address code of the command, is fed to the logic control circuit 31, wherein it is examined whether the ON (or OFF) condition satisfies a control condition, that is the examine command TNA, TFA, TNO or TFO, and the examined result is then temporarily maintained. In the execution of the output command, a solenoid or the like which is connected with an address designated by an address code of the command, is set when the command is SON or reset when SOF.

For the purpose of supplying the numerical control data to the numerical controllers 16, the computer 10 is programmed to selectively set such output commands SON, SOF in the interface register 34. The sequence controller 13 further includes a memory control circuit (not shown) which halts the read-out operation of the memory device 30 only when the computer 10 sets information in any one of the registers 34, 35 or both. Therefore, when the computer 10 selectively sets the output commands SON, SOF in the interface register 34, the sequence controller 13 is operated to cause the logic control circuit 31 to read the output command SON or SOF by an instruction register (not shown) thereof, instead of any command from the memory device 30, and executes a control operation in accordance with the output command SON or SOF. In addition, one block of the numerical control data has a plurality of letters or least units each of which is expressed by 8-bit signals of logical value of 1 or 0. Accordingly, when the output command SON or SOF corresponding to one of the 8-bit signals and an address code designating the bit position are transferred from the computer 10 to the interface register 34, it is desirable to set a part of one letter in the input-output circuit 32 and further to supply the same to the numerical controller 16 through the input-output circuit 32. Since one letter of the numerical control data is represented by the 8-bit signals as mentioned above, the data transfer for one letter can be accomplished through 8-time executions of the output commands and it is possible to send a number of letters of the numerical control data when the execution of the output command is repeated a plurality of times.

Figures 5, 6, 7:
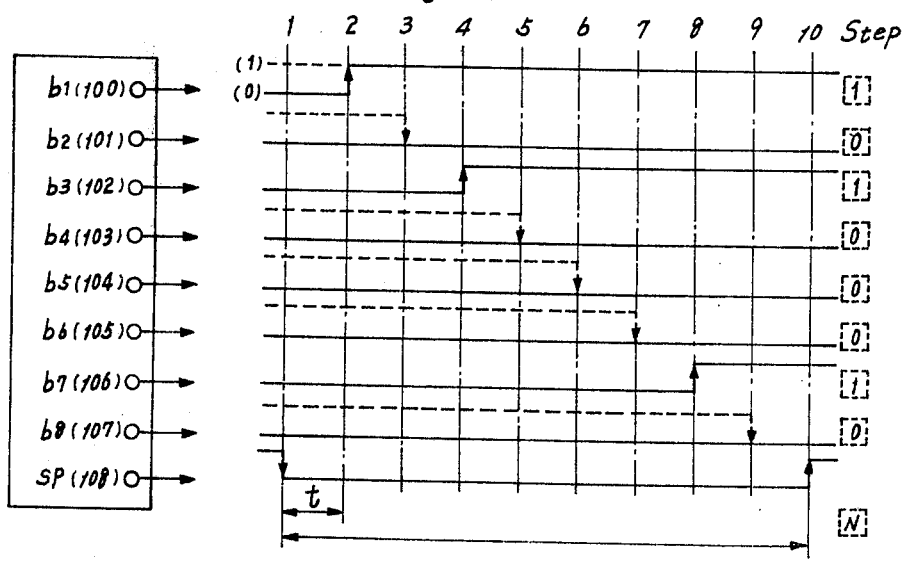
FIG. 5 shows exemplified numerical control data and the code format of the data.
FIG. 6 shows output commands transferred from the computer through plural steps for one letter of the numerical control data.
FIG. 7 shows a time chart of signal conditions of an input circuit corresponding to the steps in FIG. 6.
Figure 8:
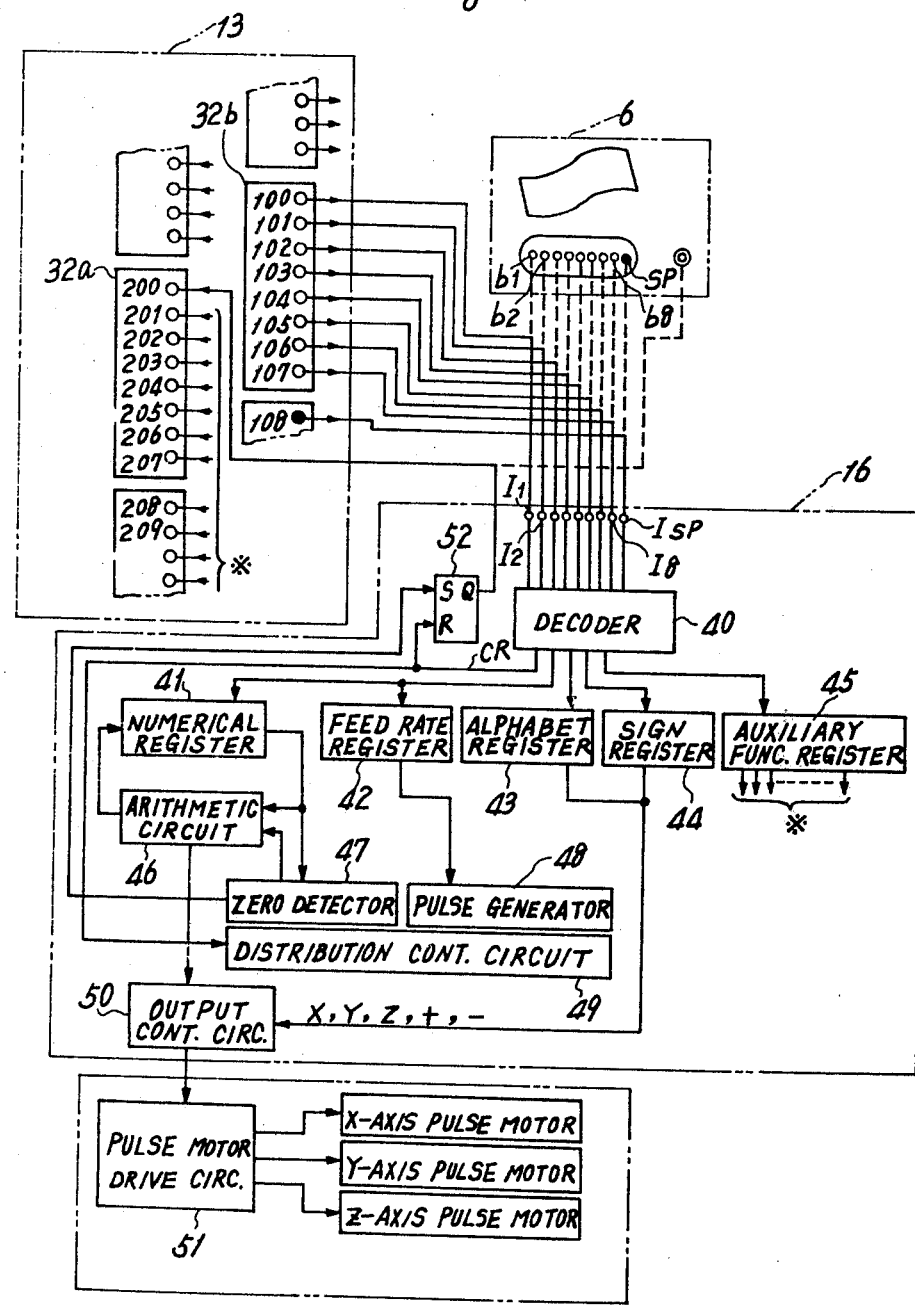
FIG. 8 is a block diagram showing the details of the numerical controller in FIG. 4 and the connection to the programmable sequence controller.

By way of example, one block of the numerical control data is assumed to be [NOO1X-1250 FO], which is encoded as shown in FIG. 5 in the form of the EIA standard format. It is herein considered the instance where the data of a letter [N] is sent. A code representing N is 1 at the first, third, and seventh bits $b1$, $b3$, $b7$ and 0 at the remaining bits $b2$, $b4$-$b6$, $b8$. Accordingly, the code N is converted to the combination of command codes as shown in steps 2 to 9 of FIG. 6. A command SON 100 in step 2 is a set command for setting an ON-condition in an address of number 100 of the output circuit 32b, which address is connected with a first data input terminal I1 corresponding to the first bit $b1$ of the numerical controller 16 as shown in FIG. 8. A command SOF 101 in step 3 is a reset command for setting an OFF-condition in an address of number 101 of the output circuit 32b, to which address a second data input terminal I2 corresponding to the second bit $b2$ of the numerical controller 16 is connected. The commands of other steps 4-9 are set or reset commands for setting or resetting addresses of numbers 102-107 corresponding respectively to the third to eighth bits $b3$-$b8$. The step 10 includes a set command for producing a read command signal SP so as to cause the numerical controller 16 to read the 8-bit data which was sent in accordance with the steps 2 to 9. The read command signal SP is given to an address of number 108 of the output circuit 32b, and the data which has been set at the addresses of numbers 100-107 of the output circuit 32b is read by the numerical controller 16. The step 1 includes a reset command for resetting the read command signal SP before the sending of the 8-bit data.

As described above, the data of one letter of the numerical control data is sent to the numerical controller 16 when the computer 10 sets such output commands as shown in FIG. 6 in the interface register 34 in order and is decoded by a decoder 40 in the numerical controller 16 and is then sent in turn to one of the reigsters 41-45 in FIG. 8.

The one block data NOO1X-1250 FO are sent one letter by one letter and are decoded by the decoder 40 whereby X,-,1250, and FO are preset respectively to the alphabet register 43, the sign register 44, the numerical register 41 and the feed rate register 42. The data NOO1 denotes a sequence number which is registered in a sequence number register (not shown). The feed rate register 42 is connected to the input terminal of a pulse generator 48, whose frequency is therefore controllable by the feed rate data set in the feed rate register 42. Moreover, the pulse generator 48, the numerical register 41, an arithmetic circuit 46, a zero-detecting circuit 47 and a distribution control circuit 49 are so connected with one another that the arithmetic circuit 46 transmits a pulse train from the generator 48 to the numerical register 41, in which the feed amount set therein is subtracted one by one at each time of arrival of one pulse signal. The zero-detecting circuit 47 discriminates whether or not the feed amount within the register 41 is reduced to zero $<0>$. The arithmetic circuit 46 also serves to transmit one output pulse to an output control circuit 50 whenever one pulse signal is input thereto, until the zero detecting circuit 47 generates a zero detecting signal. The output control circuit so performs the selection of gate circuits thereof in accordance with the axis designating data and the direction designating data connected to the alphabet register 43 and the sign register 44. Consequently, any one of the pulse motors for the X, Y, Z axes which are connected to the output control circuit 50 through a pulse motor drive circuit 51, is rotated in accordance with the numerical control data set in the registers 41-44. In this instance, since the control data is X-1250 FO, only the X-axis pulse motor is driven an increment of 1250 at a feed rate corresponding to FO in the minus direction.

In FIG. 8, there is further provided a data requesting flag or a flip-flop circuit 52, which is so connected as to be reset by a block-end indicating data CR supplied from the decoder 40 and to be set by a zero detecting signal from the detecting circuit 47. The flag 52 is connected at its set output terminal with an address of number 200 of the input circuit 32a of the sequence controller 13. When the flag 52 is set, in other words a data request is applied, the computer 10 supplies a subsequent block of the numerical control data to the sequence controller 13 as a result of recognizing the data request in accordance with one of the following:

RECOGNITION OF DATA REQUEST

1. Monitoring Method

In the computer 10, a clock pulse train is always being generated, according to which an interruption is applied periodically, (e.g., at a few milliseconds cycle) from the computer 10 to the sequence controller 13 to read the signal condition of the specified address (the address of number 200) of the input circuit 32a. The code of this interruption command is IOD200 and the computer 10 sets the code IOD and the specified address code 200 to the interface register 34 of the sequence controller 13 through the interface circuit 12. In the completion of the setting of the codes, the logical control circuit 31 reads the codes from the interface register 34 instead of the data from the memory device 30, and then executes the command of the code IOD as follows: As the specified address code <200> is fed to the input-output circuit 32, the address of number 200 of the input circuit 32a is selected, so that the signal condition (the presence of the request signal for the numerical control data) of the address 200 is fed to the logic control circuit 31 to be detected. At the same time, the signal condition of the address 200 is converted to a predetermined code of five bits and is set in the output register 36 along with the address code of eleven bits registered in the instruction register.

The content of the output register 36 is subsequently transferred through the data line 11a, the interface circuit 12, and the data line 11 to the computer 10, which thus recognizes the signal condition set in the specified address 200 of the input circuit 32a. That is, the computer 10 recognizes the data request if the signal condition is ON and the absence of the data request if OFF. By performing such operational steps as above, the computer 10 always monitors the signal condition set in the specified address of the input circuit 32. Accordingly, it should be appreciated that as soon as the data request is generated from the numerical controller 16, another block of the numerical control data may be transmitted to the numerical controller 16 through the sequence controller 13.

2. Interruption Method

This method may be substituted for the aforementioned one.

A program for recognizing the data request signal for the numerical control data set in the specified address 200 of the input circuit 32a is stored in the memory device 30 of the sequence controller 13 so as to monitor the request signal periodically. The program comprises an examine command (TNA) for examining whether the signal condition of the address 200 is ON, an interruption request command (RQI) for requesting an interruption to the computer 10 when the examine result is ON, and a conditional jump command (JMF) for jumping the interruption request command (RQI) if the examine result is OFF. In this embodiment, the monitoring program stored in the memory device 30 follows the execution routine of the sequence control program with respect to the order of the memory address. Accordingly, the sequence controller 13 is, after the execution of the sequence control program, so operated as to examine whether the address 200 reveals an ON-condition in accordance with the examine command (TNA 200), and to set the interruption request signal (RQI) in the output register 36 if the examine result reveals an ON-condition. During this interruption, the computer 10 sets a numerical control data in the interface register 34 in the form of data segments divided by the unit of each bit as explained above. As a result, interruptions for supply of the numerical control data are given to the sequence controller 13. If the examine result reveals, however, an OFF-condition, the sequence controller 13 continues the sequence control operations without executing the interruption request command (RQI) since the conditional jump command (JMF) is executed in this event.

As the monitoring program can not be executed unless all of the programs within the memory device 30 are scanned at least one time, a time delay may occur because of time required for the scanning of the programs except the monitoring program from the time the data request signal for the numerical control data is issued until the time the requested data is transferred. In order to reduce the time delay, additional programs identical to the monitoring program may be inserted in the sequence control program. Consequently, even if the sequence program is quite long, the sequence controller 13 can by itself recognize the presence of the data request signal immediately and can therefore without the time delay offer the data request for the numerical control data to the computer 10 and can receive the data from the computer.

According to the data transfer system as described above, only nine terminals of the output circuit 32b and one terminal of the input circuit 32a are used for one numerical controller. Therefore, even where data are distributed to ten numerical controllers, at most, 100-terminals of the input and output circuits 32a, 32b are used and nothing else is necessary. Furthermore, since other remaining terminals of the input-output circuit 32 are available for sequence control, no over-load is imposed on the sequence controller in performing data distribution. Additionally, the time required for data transferring of one letter which is carried out through such ten step executions as mentioned above is less than 100 $\mu$m secs. (microseconds), which equals the speed of 30-50 times as fast as the reading speed of a conventional tape reader. For this reason, even when discontinuity of the sequence control operation is brought about by the data transfer, no problem occurs with the sequence control due to the fact that the discontinued time is extremely short compared with the responsive time of the controlled machine elements.

Figure 9:
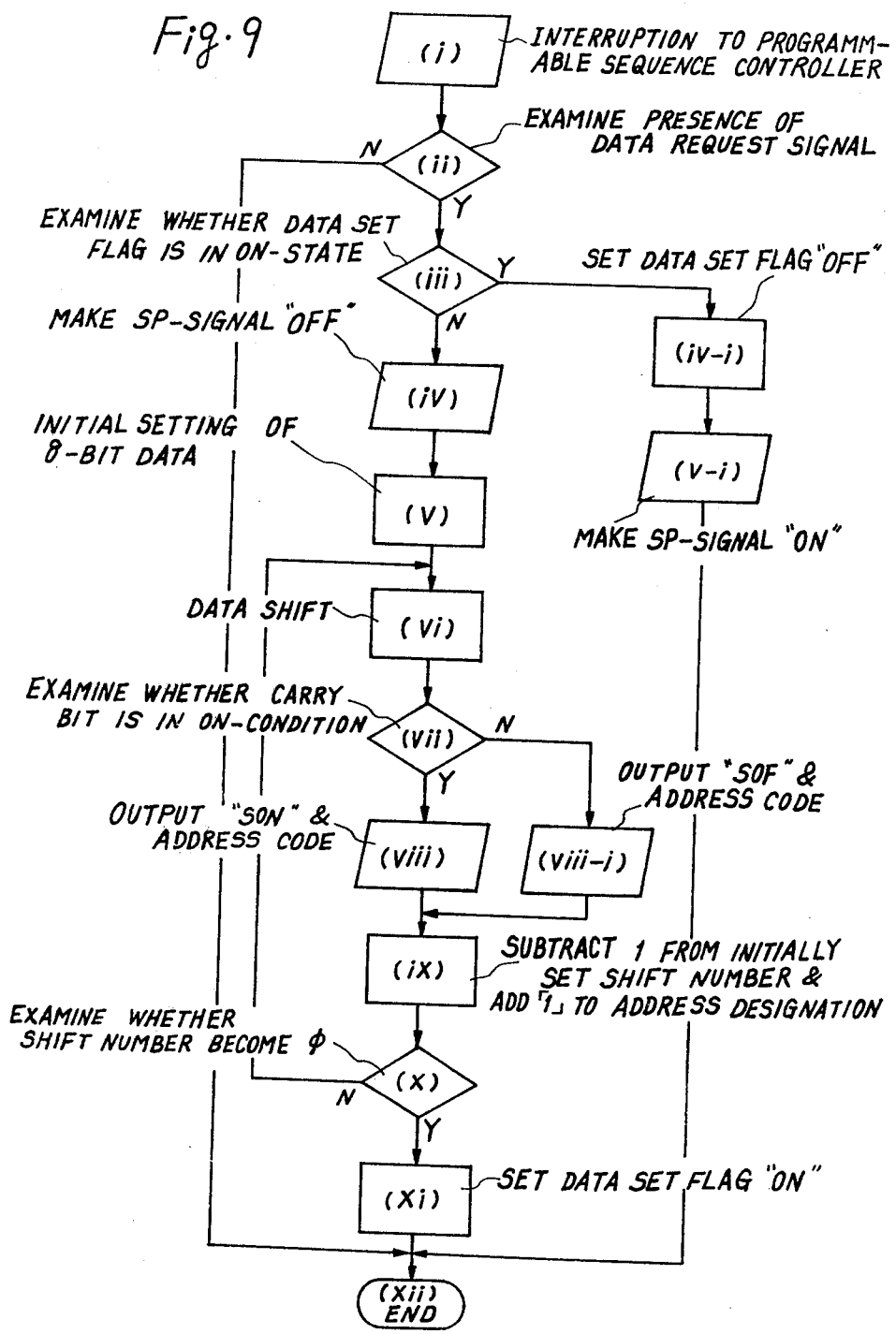
FIG. 9 shows a flow chart of a data transfer program contained in the digital computer.

FIG. 9 shows by a flow chart the computer's operations for recognizing the presence of the data request for the numerical control data and for transferring the data. With reference to the flow chart, execution processes of the computer will be explained. In step (i), an interruption depending on the above-noted clock pulse train is applied to the sequence controller 13 which is thus caused to execute instructions or commands from the computer 10. An examination of the presence of a request for numerical control data is executed in step (ii). In this step, such operations as mentioned in the monitoring method (1) are executed in order for the computer 10 to read the signal condition on the specified address 200 of the input circuit 32a. When the data request is not issued, the process step advances to step (xii) to await arrival of the following clock pulse. When the data request is, however, recognized, an examination is made whether a data set flag (now shown) is in its On-condition. This data will be set in its ON-condition in step (xi) when the data of 8-bits (one letter) will have been set to the output circuit 32b. Accordingly, since the data set flag is not in its ON-condition in the meantime, a sprocket signal SP is rendered OFF in step (iv). The step (iv) corresponds to the step 1 shown in FIG. 6 wherein the address number 108 of the output circuit 32b is reset.

The following step (v) provides initial settings as a preparatory process prior to transferring the 8-bit data. The data for one letter of the numerical control data which have been set in an interior memory device of the computer 10 after being read from the magnetic disc 20 used as an outer memory device are taken out, so as to be set in an accumulator (not shown). A numeral <8> is set in a first counter provided in the computer 10. In step (vi), the 8-bit (one letter) data being set in the accumulator is shifted one bit. An examination is executed in step (vii) to determine whether the carry bit is in its ON-condition. If ON, a set output command code SON and an address code 100 are transferred to the sequence controller 13 in step (viii). If OFF, a reset output command SOF and the address code 100 are similarly transferred. In step (ix), the first counter for counting the shifting time of the accumulator has its content subtracted by 1, and 1 is added to a second counter of the computer 10 which is used to designate the terminal addresses of the sequence controller 13 in order.

An examination is executed in step (x) to determine whether the content of the first counter is zero or not. If the examine result is not zero, the execution step returns to step (vi) and the data in the accumulator is further shifted by 1 so as to examine whether the carry bit is in ON or OFF condition according to which an output command SON or SOF is thereafter transferred together with an address code 101 added by 1. These steps (vi) to (ix) are repeated by the time the content of the first counter is reduced to 0 (zero). When the content becomes 0, the data set flag is set to ON in step (xi), the execution step waiting until the time a further following clock pulse is generated. In response to the further following clock pulse, the execution step commences again from step (i) and, because of the On-condition of the data set flag, moves to step (iv-i), where the flag is turned to OFF. Then, the sprocket signal SP is turned ON in step (v-i) which corresponds to step 10 in FIG. 6 whereby the address number 108 of the output circuit 32b is turned ON. In such a way, the 8-bit data can be transferred to the numerical controller 16.

Figure 10:
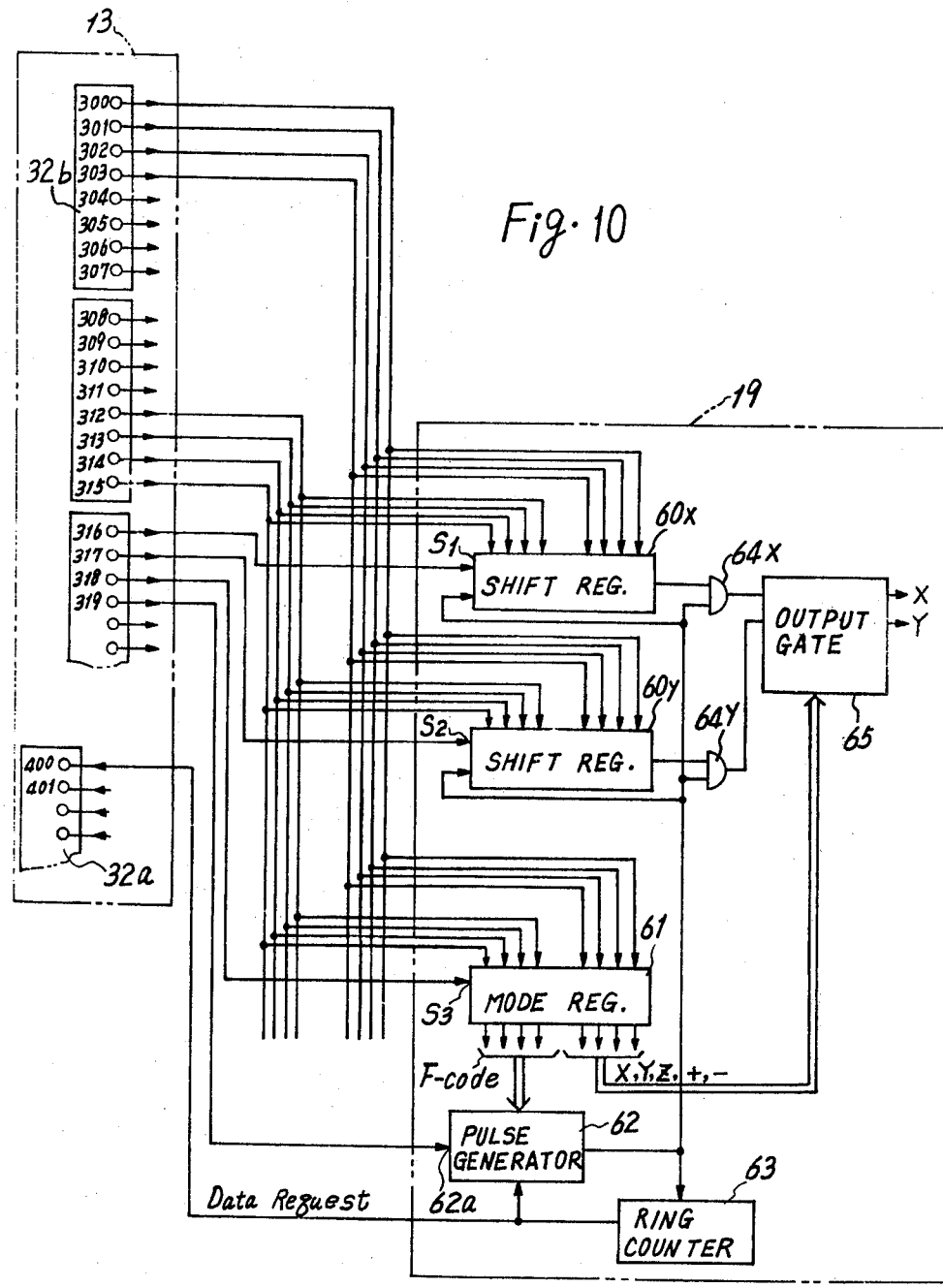
FIG. 10 is a block diagram showing the connection between the input-output circuit and a machine control unit.

Referring now to FIG. 10 which shows the connection between the machine control unit 19 and the input-output circuit 32 of the sequence controller 13, primary system components of the machine control unit 19 comprise presettable shift registers 60x, 60y for X and Y-controlled axes, a mode register 61, a pulse generator 62, a ring counter 63, AND gates 64x, 64y and an output gate circuit 65. Interpolation data calculated by the computer 10 are preset respectively to the shift registers 60x, 60y, which upon receiving pulse signals generated by the pulse generator 62 at the rate of a feed rate data shift the interpolation data synchronously to supply the synchronized output pulses proportional to the feed rate to the output gate circuit 65 through the AND gates 64x, 64y. Preset to the mode register 61 are axis and direction designating signals X, Y, t, -, according to which the output gate circuit 65 selects the axes to be controlled and the directions to be moved. The ring counter 63 is provided to detect the completion of the register's shifting operation, and is filled upon receiving from the pulse generator 62 pulse signals of the same number as the bit number of the shift register 60x or 60y so as to generate a request signal for the following interpolation data, if further being restored to its initial state. The request signal is supplied to the pulse generator 62 so as to make it inoperative and also to an address of number 400 of the input circuit 32a.

The shift registers 60x, 60y each has, for example, sixteen register bits having data input terminals connected respectively to addresses of numbers 300-315 of the output circuit 32b. Data input terminals of the mode register 61 are similarly connected to the addresses of numbers 300-315. Setting instruction terminals S1, S2, S3 of the shift registers 60x, 60y and the mode register 61 are connected respectively to addresses of numbers 316-318 of the output circuit 32b. An address of number 319 which is turned to its ON-condition when the setting of all the data required by the machine control unit 19 is completed, is connected to an operating terminal 62a of the pulse generator 62 for causing the generator to generate the pulse signals.

In response to the request signal supplied to the address 400, the computer 10 transfers as one data unit 16-data signals, which are thus preset to the output circuit 32b in a manner as described above with reference to FIG. 6. Assuming now that one data unit for the X-axis is [1,1, 1, ... 1, 1, 1], the computer 10 transfers to the interface register 34 in order command and address codes SOF 316, SON 300, SON 301, SON 302-SON 315 and SON 316 so as respectively to reset the address 316 in the first step, set the address 300 in the second step, set the address 301 in the third step, set the addresses 302-315 in the fourth to seventeenth steps, and finally, set the address 316 in the eighteenth step, whereby the data unit for the X-axis may be preset to the X-axis shift register 60x. Thereafter, command and address codes which are arranged in accordance with another unit data for the Y-axis are transferred in order from the computer 10 to the interface register 34 through the execution of 18-steps so as to set Y-axis interpolation data also comprising 16-data signals in the Y-axis shift register 60y. In this case, the address codes in the first and eighteenth steps are changed to designate the address 317 which is connected to the setting instruction terminal of the Y-axis shift register 60y.

Furthermore, the other data necessary for the controlling are set in the mode register 61 in a manner similar to the above. Since the setting of all the data is completed as a result, the address 319 is then turned ON in accordance with set command and address codes SON 319. Accordingly, the pulse generator 62 initiates the generation of the pulse signals so that the interpolation data preset in the X and Y-axis shift registers 60x, 60y may be supplied as output pulses to the output gate 65 at the rate of the feed rate data. When the interpolation data have been shifted through 16-times, the ring counter 63 generates the request signal for the following interpolation data and restores its initial state. The request signal is transmitted to the address 400. After recognizing the request signal, the computer 10 sends the following interpolation data respectively to the shift registers 60x, 60y. Thus, according to the present invention, the sequence controller 13 is applicable also to transferring the interpolation data from the computer 10 to the machine control unit 19.

Figures 11, 16:
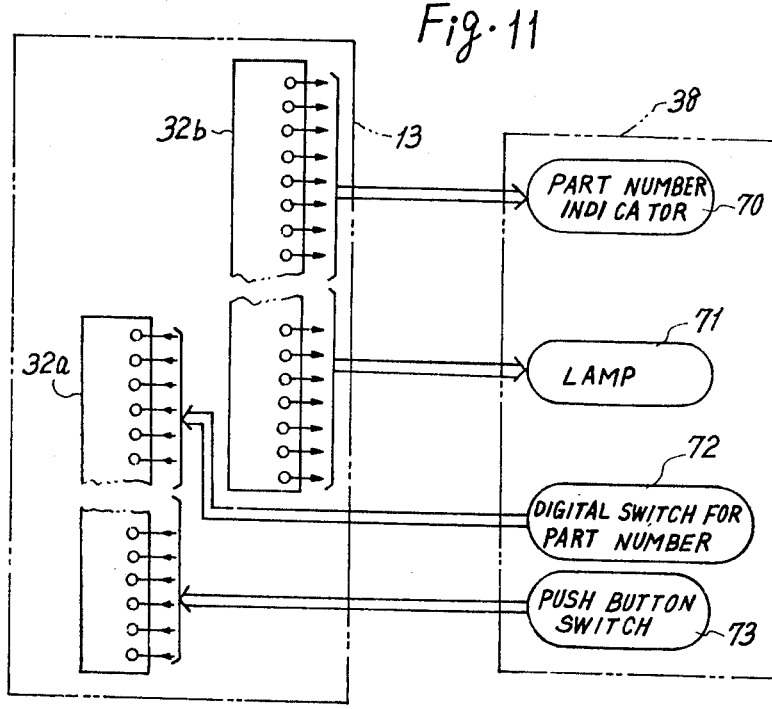
FIG. 11 shows the connection of the input-output circuit with a setting and indicating console.
FIG. 16 shows an example of a program of the sequence controller for decoding an auxiliary function data.

FIG. 11 shows the connection between the setting and indicating console 38 and the input-output circuit 32 of the sequence controller 13. For inquiries from each of the machine tool 14, 14 to the computer 10 and data transfer therebetween, the setting and indicating console 38 is provided, like that in the prior art system, with a numeric indicator tube 70 for indicating part or workpiece numbers, a digital switch 72 for designating the workpiece numbers, a push button switch 73 for informing of completion of the designation, and illuminating lamps, one for indicating the completion of the designation. The numeric indicator tube 70 has input terminals of four times as many as its digits since the BCD code requires 4 bits for each of the digits, and the input terminals are connected respectively to terminals of the output circuit 32b. The illuminating lamp 71 and the other lamps are connected also to the output circuit 32b. The digital switch 72 has input terminals of four times as many as its digits for the same reason as with the indicator tube 70, and the input terminals as well as that of the push button switch 73 are connected to the respective terminals of the input circuit 32a.

When it is necessary that the numerical control data for a workpiece be supplied to the numerical controller 16 or the machine control unit 19, an operator sets a workpiece number assigned to the workpiece on the digital switch 72, and then pushes the push button switch 73. The signal condition of the terminal of the input circuit 32a which is connected to the push button switch 73 is monitored by the computer 10 in a similar manner to the one explained above in connection with the data request from the numerical controller 16. Accordingly, upon the recognition of the data request depending upon the pushed push button switch 73, the computer 10 reads the workpiece number set on the digital switch 72 and sends through the sequence controller 13 the numerical control data selected in accordance with the workpiece number to the numerical controller 16 or the machine control unit 19 associated with the console 38.

The computer 10, in addition to the control data, sends to the sequence controller 13 in order output command codes SON, SOF . . . with address designations of the terminals which are connected to the numeric indicator tube 70 and the setting completion lamp 71. As a result, the signal conditions of the terminals are changed based upon the output commands SON, SOF . . . so that the indication of the workpiece number on the numeric indicator tube 70 and and illumination of the setting completion lamp are duly accomplished. As understood from the foregoing, the sequence controller 13 makes it possible for the computer 10 to recognize the signals not only from the numerical controller 16 and the machine control unit 19 but also from the setting and indicating console 38, and besides transmitting the necessary data from computer 10, enables the console 38 to indicate the data. Moreover, the data transmission in this case is achieved only by means of connecting the terminals of the console 38 with the input-output circuit 32 of the sequence controller 13.

DECODING AND AUXILIARY FUNCTION DATA

Figure 12:
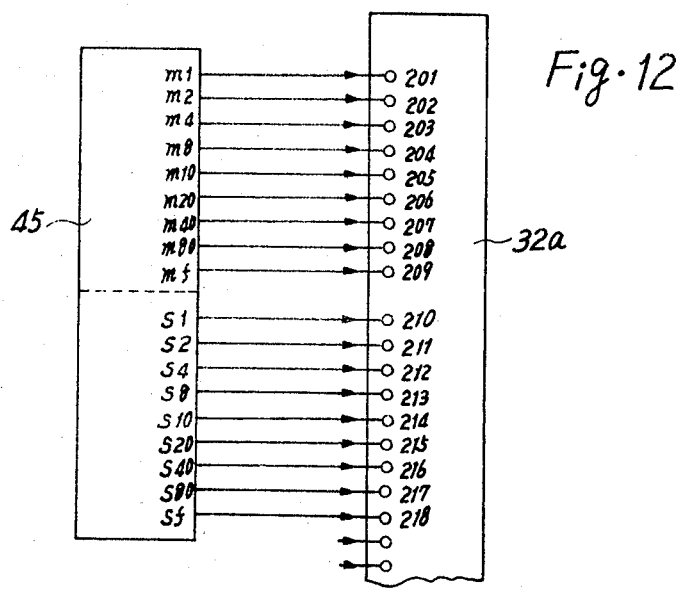
FIG. 12 shows the connection between the input circuit and on auxiliary function register of the numerical controller.

As auxiliary function data, there are prepared S-function data for instructing rotational speeds of a tool spindle and various M-function data. Each of the S and M-function data is represented by a two-digit number in BCD code. The auxiliary function data is supplied in one block of the numerical control data from the computer 10 through the sequence controller 13, and is preset to an auxiliary function register 45 of the numerical controller 16 shown in FIG. 8: Output terminals M1-M80, mf, S1-S80, sf of the register 45, as viewed in FIG. 12, are connected respectively to addresses of number 201-218 of the input circuit 32a. The register 45 is further so arranged as to produce a first function signal when the M-code has been registered along with a two-digit number therein and a second functional signal when the S-code has been registered along with a two-digit number.

Figure 13:
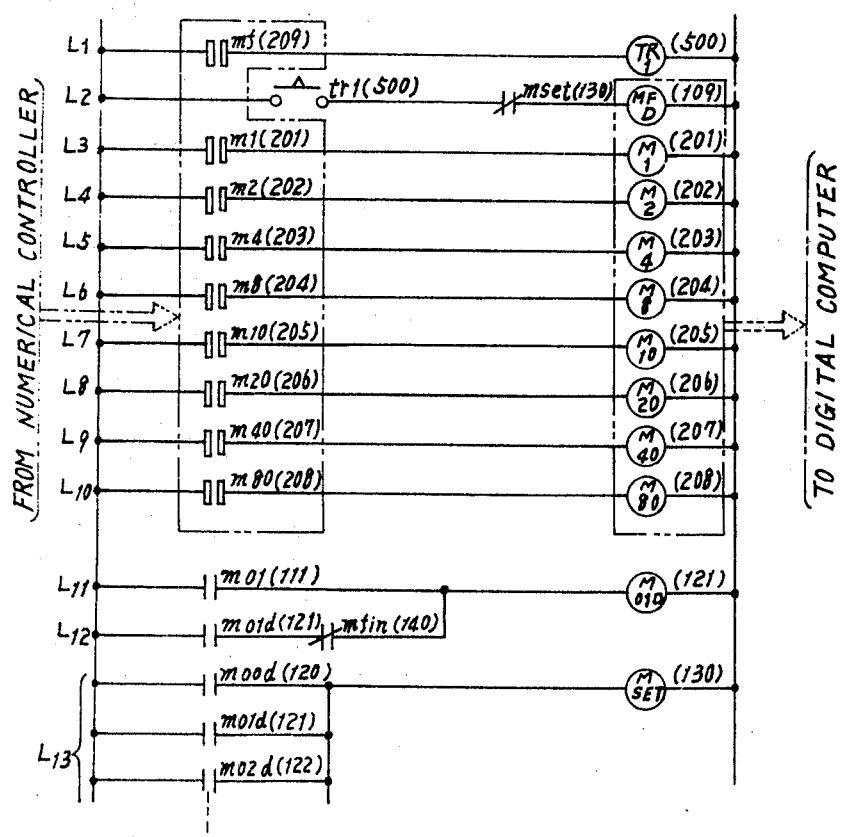
FIG. 13 shows a decoding request program provided for the sequence controller in the form of a relay circuit.

The first and second function signals supplied from the terminals mf, sf, are converted by the sequence controller 13 respectively to first and second decoding request signals, MFD, SFD with a time lag of about 10 msecs. (milliseconds). The time lag is provided by utilizing a timer function of the sequence controller 13 in accordance with a delay program. This program comprises the following steps (a) to (e);

a. Examine command (TNA209) for examining whether the signal condition of the address 209 of the input circuit 32a is ON, b. Conditional set command (YON500) for setting a timer connected to an address 500 if the result of (a) indicates ON, c. Examine command (TNA500) for examining whether the signal condition of the address 500 is ON;

d. Examine command (TFA130) for examining whether a M-function decoding completion signal MSET of an address 130 is OFF under the condition of being ANDed with the result of (c), the signal MSET being applied to the address 130 when the computer 10 has decoded the M or S-function, as will be described later;

e. Conditional set command (YON109) for setting the address 109 if the results of (c) and (d) are satisfied;

If represented by relay circuit, it may be composed as shown between line numbers L1 and L2 in FIG. 13.

As FIG. 13 shows, the signal MFD applied to the terminal of the address 109 is the decoding request signal to the computer 10 and is monitored by the computer in a manner similar to the above-mentioned monitoring method (1) or interruption method (2). When the computer 10 supplies monitoring commands IOD201, IOD202-IOD208 in order to the input register 35 as a result of recognizing the presence of the decoding request MFD, the signal conditions of the addresses 201-218 of the input circuit 32a are transmitted to the output register 36 in order for a short period by the time the computer 10 outputs the successive monitoring command. Accordingly, by reading the signal conditions in order and decoding the same, the computer 10 is able to be aware what the number of the M-function code is and is able to set a predetermined one of dummy output elements of the output circuit 32b based upon the recognized number.

If it is assumed that the addresses 110, 111, 112 . . . of the dummy elements are assigned respectively to the M-functions M00, M01, M02, . . . and that the decoding result is M01, a set command (SON111) for setting the address 111 is supplied from the computer 10 to the interface register 34 so that a dummy output element of the address 111 may be activated. In the sequence controller 13, the addresses 110, 111, 112, . . . are so set as the above are monitored in accordance with the sequence control program. A machine operation corresponding to the M-function M01 is performed when the interlocking condition of the M-function with other control operations is satisfied.

A circuit on line numbers L11-L13 in FIG. 13 shows a program for producing the above-noted M-function decoding completion signal MSET. Although a part on lines L11, L13 of the circuit typically refers to the M-function M01, it should be realized that programs each represented by such a relay logic are provided respectively for the other M-functions. A relay M01D corresponds to the dummy output element of the address 111 which is held energized until the machine operation according to the M-function M01 is completed. When the dummy output element M01D is activated, another output element MSET associated with the M-function decoding completion signal MSET is activated so as to reset the decoding request signal MFD which is represented by a relay on line 2. Consequently, the computer 10 terminates the decoding operation for the M-function M01, and returns to such a process step as it was at before execution of the M-function.

Flow charts expressing the operation of the computer 10 in reading and decoding the M-function data are shown in FIGS. 14, 15. Step (i) in FIG. 14 starts upon the recognition of the decoding request signal MFD, and the computer's execution step advances to step (ii), further jumping to a subroutine shown in FIG. 15 for reading the M-function code and converting the code to a corresponding binary code. Step (i) in FIG. 15 occurs as a result of the jump, and the initial setting is executed in step (ii). In step (iii), a weight pointer which selectively designates weights (binary codes) in a predetermined order is set to its initial state, the binary codes corresponding respectively to the signals of the M-function data. The signal $ml$ conducted to the output register 36 is read in step (iv). After step (v) for examining whether the data, the signal $ml$, is erroneous or not, an examination whether the condition of the signal $ml$ is ON is executed in step (vi). If ON, a weight (a binary code) designated by the weight pointer is added to an accumulator $Ac\phi$ in step (vii). If OFF, the weight is not added. In this event, <1> in binary code is added since the signal $ml$ corresponds to <1> in BCD code.

The weight pointer is advanced by <1> in step (viii). It is examined in step (ix) whether the reading of the signals has been carried out 8-times. If less than 8-times, the execution step returns to step (iv) wherein the following signal $m2$ is read. If the signal $m2$ is confirmed to be ON in step (vi) after step (v), another weight corresponding to <2> in binary code is added to the accumulator $Ac\phi$ in step (vii). Since the weights designated by the weight pointer at the respective times of the readings of the signals $m1, m2, m4, \ldots m80$ are respectively <1>, <2>, <4>, <8>, <10>, <20>, <40>, <80> in binary code, the content of the accumulator $Ac\phi$ becomes a binary code corresponding to the M-function number when the 8-time readings are completed.

The execution step is further advanced to step (x) for setting the content of the accumulator $Ac\phi$ to a register ANS and to step (xi) for clearing the accumulator $Ac\phi$ and then goes back to the routine in FIG. 14 whereby the process for the subroutine terminates. In step (iii) of FIG. 14, it is examined whether or not there is any error flag which was set in step (v-i) of the subroutine. If not, a search is made in step (iv) which an address having a code which corresponds to the converted binary code. An examination is executed in step (v) whether code concerned exists or not. If found to exist, a set output command SON is issued together with the address concerned in step (vi). The address concerned instructs the M-function corresponding to the decoding result and the routine in FIG. 14 is completed after preparatory processes to another routine are executed in steps (vii), (viii).

The decoding operation by the computer 10 is applicable also to the S-function, of which the detailed decoding process is, however, omitted since it is almost the same as that of the M-function.

As described above, where the decoding of the auxiliary function is performed by the computer 10, the decoding program can be simplified, so that the number of memory words for the decoding program may be reduced to a minimum. Furthermore, the sequence controller 13 may be prevented from being overloaded.

In case the number of the auxiliary functions to be employed is a few, it is possible to provide a decoding program for the memory device 30 of the sequence controller 13. An example of the decoding program is explained hereinunder.

Since one auxiliary function is represented by the combination of the nine signals ($mf, ml, m2, m4, m8, m10, m20, m40, m80$) as mentioned above, the decoding program for each auxiliary function can be provided by utilizing nine examine commands (TNA, TFA) respectively for examining ON and OFF-conditions of the nine signals and a conditional output command (YON) for setting a predetermined dummy output element of the output circuit 32b if the result of the examine commands are all satisfied. For example, since a M-function M03 is informed by the signals $mf, ml, m2$ of the ON-condition and the others of the OFF-condition, a program for decoding the M-function M03 is provided with three TNA commands for the signals $mf, ml, m2$, six TFA commands for the others $m4, m8, m10, m20, m40, m80$, and one conditional set output command (YON) which instructs a dummy output element to be set if all of the TNA and TFA commands satisfy the respective examine conditions. Where an address 113 of the output circuit 32b is assigned to the dummy output element, the decoding program for the M-function M03 is set up as shown in FIG. 16.

Other decoding programs for other auxiliary functions are also set up in this way, and all of the decoding programs are stored in the memory device 30 of the sequence controller 13. Accordingly, the auxiliary function data are decoded by the sequence controller 13 which operates in accordance with the decoding programs so that machine operations instructed by the auxiliary function data may be performed. In practice, the decoding program for each auxiliary function data requires as many as ten memory words, and it is therefore apparent that such decoding method is advantageous only where the number of the auxiliary functions is a few.

Obviously, numerous modifications and variations of the present invention are possible in light of the above teachings. It is therefore to be understood that within the scope of the appended claims the invention may be practiced otherwise than as specifically described herein.

What is claimed as new and desired to be secured by letters patent of the United States is:

1. A machine control system comprising in combination;
   a plurality of numerically controlled machines;
   a plurality of machine controllers respectively connected with said machines for controlling the operations of said machines in accordance with numerical control data;
   a digital computer provided with a memory device for storing said numerical control data and adapted to convert each of the least units of said numerical control data to a predetermined number of set and reset commands;
   a programmable sequence controller comprising:
   a. an input-output circuit provided with a plurality of addressable input and output terminals, a predetermined number of said output terminals being addressed respectively to data input terminals of said machine controllers,
   b. a program memory device for containing a predetermined sequence control program,
   c. register means connected with said digital computer for receiving from said digital computer said set and reset commands along with address codes designating said predetermining number of said terminals, and
   d. a logic control circuit adapted to set or reset one of said output terminals as a result of examining the signal conditions of said input terminals in accordance with said sequence control program and to set or reset said output terminals addressed to said data input terminals when said set and reset commands and said address codes are supplied from said register means, whereby said programmable sequence controller is operable as a data transmitter for said numerical control data between said digital computer and said machine controllers.

2. A machine control system as claimed in claim 1 wherein each of said machines is a numerically controlled machine tool for machining a workpiece.

3. A machine control system as claimed in claim 2 wherein at least one of said machine controllers is a numerical controller which comprises a decoder for decoding signal conditions of said data input terminals to a letter data each time said predetermined number of set and reset commands have been transferred respectively to said data input terminals.

4. A machine control system as claimed in claim 3 wherein said decoder has a reading signal terminal and is operable to decode said signal conditions of said data input terminal when a reading command signal is input to said reading signal terminal.

5. A machine control system as claimed in claim 2 wherein at least one of said machine controllers is a machine control unit which comprises presettable shift registers each connected at a predetermined number of data preset terminals thereof with said output terminals of said input-output circuit for receiving a predetermined number of interpolation data from the computer through the sequence controller and a pulse generator connected for generating shift pulse signals to said shift registers to cause said shift registers to output drive pulses in accordance with said interpolation data.

6. A machine control system as claimed in claim 5 wherein said output terminals connected respectively with said data preset terminals of one of said shift registers are identical to those connected respectively with said data preset terminals of the other shift register, and each of said shift registers further has a setting command terminal so as to receive and interpolation data when a setting command signal is given to said setting command terminal from said sequence controller.

7. A machine control system as claimed in claim 6 wherein said machine control unit further includes a ring counter responsive to said shift pulse signals from said pulse generator for generating an interpolation data request signal to said input-output circuit of said sequence controller when the content of said ring counter becomes a predetermined value.

8. A machine control system as claimed in claim 2 wherein said input-output circuit is connected at specified input terminals respectively with data request terminals of said machine controllers for receiving data request signals from said machine controllers and said computer is enabled to monitor the signal conditions of said specified input terminals so as to supply through said sequence controller said numerical control data to any one of said machine controllers when said machine controllers generate said data request signal.

9. A machine control system as claimed in claim 8 wherein in order to monitor said data request signals said digital computer is tasked to periodically supply to said register means interruption commands which are respectively accompanied by the address codes for said specified input terminals.

10. A machine control system as claimed in claim 9 wherein said register means comprises a first register for receiving said interruption commands together with said address codes and a second register for informing the signal conditions of said specified address to said digital computer, and said logic control circuit is further adapted to examine the signal condition of said specified input terminals designated by said address code and then to set the result of said examination in the second register in such a format as recognized by said digital computer whenever any one of said interruption commands is set along with said address code in said first register.

11. A machine control system as claimed in claim 8 wherein said machine controllers are a numerical controller including a decoder for decoding said numerical control data and a machine control unit so constructed as to receive interpolation data directly and wherein in response to said data request signals from said numerical controller and said machine control unit said digital computer is further adapted to selectively deliver said numerical control data and said interpolation data in the form of said set and reset commands to said first register.

12. A machine control system as claimed in claim 2 wherein said input-output circuit is connected at specified input terminals respectively with data request terminals of said machine controllers for receiving data request signals from said machine controllers and wherein said program memory device is further provided with a monitoring program according to which said logic control circuit operates to examine the signal conditions of said specified input terminals and, if the presence of any one of said data request signals is recognized, to set in said register means an interruption request signal and a machine code corresponding to said machine controller generating said data request signal.

13. A machine control system as claimed in claim 12 wherein said register means of said sequence controller comprises a first register for registering said interruption request signal and said machine code from said logic control circuit and a second register for selectively receiving said numerical control data and interpolation data in the form of said set and reset commands from said digital computer.

14. A machine control system as claimed in claim 13 wherein said machine controllers are a numerical controller including a decoder for decoding said numerical control data and a machine control unit so constructed so as to receive and interpolation data directly and wherein in response to said data request signals form said numerical controller and said machine control unit said digital computer is further adapted to selectively deliver said numerical control data and said interpolation data to said second register.

15. A machine control system as claimed in claim 2 wherein each of said machine controllers includes an auxiliary function register for memorizing an auxiliary function data contained in said numerical control data supplied from said digital computer through said sequence controller, output terminals of said register being connected respectively with said input terminals of said input-output circuit, and wherein in response to a decoding request signal from said sequence controller, said digital computer is operable to read said auxiliary function data input to said input-output circuit in cooperation with said sequence controller to decode said auxiliary function data and to set in said register means an output command for an output element depending upon the result of said decoding.

16. A machine control system as claimed in claim 15 wherein said auxiliary function register is operable to generate said decoding request signal for said input-output circuit when said auxiliary function data has been registered in said auxiliary function register and said digital computer is enabled to monitor the signal condition of an input terminal of said input-output circuit assigned to said decoding request signal.

17. A machine control system as claimed in claim 16 wherein said register means of said sequence controller comprises a first register for receiving examine interruption instructions which said digital computer supplies in order in response to said decoding request signal so as to examine the signal conditions of said input terminals connected to said auxiliary function register, and a second register for receiving input interruption instructions that said logical control circuit supplies in order in response to said examine interruption instructions so as to enable said digital computer to be aware of said signal conditions of said input terminals connected to said auxiliary function register.

18. A machine control system as claimed in claim 17 wherein said output element is a dummy output element provided in said input-output circuit for use as an input element for said sequence control program stored in said program memory device.

19. A machine control system as claimed in claim 2 wherein each of said machine controllers comprises an auxiliary function register for memorizing auxiliary function data contained in said numerical control data supplied from said digital computer through said sequence controller, output terminals of said register being connected respectively with said input terminals of said input-output circuit, and wherein said program memory device is further provided with an auxiliary function decoding program for causing said logic control circuit to examine the signal conditions of said input terminals connected with said auxiliary function register and to set a predetermined output elements if the examine results are satisfied.

20. A machine control system as claimed in claim 17 wherein said predetermined output element is utilized as an input condition for said sequence program to activate a controlled element of said machine tool designated by said auxiliary function data when an interlocking condition between said predetermined output element and another input element is satisfied.

* * * * *